United States Patent [19]

McQuillan et al.

[11] Patent Number: 4,885,120

[45] Date of Patent: Dec. 5, 1989

[54] PREPARATION OF METAL OXIDE FIBERS FROM INTERCALATED GRAPHITE FIBERS

[75] Inventors: Barry W. McQuillan, San Diego; George H. Reynolds, San Marcos, both of Calif.

[73] Assignee: The United States of America as represented by the Secretary of the Air Force, Washington, D.C.

[21] Appl. No.: 217,991

[22] Filed: Jul. 5, 1988

[51] Int. Cl.$^4$ .............................................. D01F 11/10
[52] U.S. Cl. ..................................... 264/60; 264/29.2; 264/66; 264/61; 264/DIG. 19; 264/DIG. 25; 252/506; 252/507; 252/508; 423/447.6; 423/447.8; 423/448; 423/460
[58] Field of Search ....................... 252/506, 507, 508; 423/445, 447.1, 447.2, 447.5, 448, 449, 460; 264/29.1, 29.2, 82, 60, 66, 61, DIG. 19, DIG. 25; 427/447.6, 447.8

[56]   References Cited

U.S. PATENT DOCUMENTS

| 3,385,915 | 5/1968 | Hamling | 264/5 |
| 3,760,049 | 9/1973 | Borer et al. | 264/57 |
| 3,795,524 | 3/1974 | Sowman | 106/65 |
| 3,950,478 | 4/1976 | Kenworthy et al. | 264/234 |
| 3,982,955 | 9/1976 | Mansmann et al. | 106/307 |
| 4,047,965 | 9/1977 | Karst et al. | 106/65 |
| 4,102,937 | 7/1978 | Harris | 260/666 |
| 4,110,252 | 8/1978 | Smith et al. | 252/442 |
| 4,175,153 | 11/1979 | Dobo et al. | 428/398 |
| 4,267,210 | 5/1981 | Yajima et al. | 427/226 |
| 4,268,278 | 5/1981 | Dobo et al. | 55/16 |
| 4,533,508 | 8/1985 | Stevens | 264/22 |

*Primary Examiner*—Hubert C. Lorin
*Attorney, Agent, or Firm*—Fredric L. Sinder; Donald J. Singer

[57] ABSTRACT

Ceramic metal oxide fibers are made by intercalating graphitic graphite fibers with a mixture of metal chlorides and then heating the intercalated fibers to oxidize or burn off the carbon leaving a metal oxide fiber having generally the shape and structure of the graphite fiber precursors to make composite fibers, such as binary fibers of aluminum oxide-zirconium oxide and aluminum oxide-ferric oxide.

2 Claims, No Drawings

PREPARATION OF METAL OXIDE FIBERS FROM INTERCALATED GRAPHITE FIBERS

RIGHTS OF THE GOVERNMENT

The invention described herein may be manufactured and used by or for the Government of the United States for all governmental purposes without the payment of any royalty.

CROSS-REFERENCE TO RELATED APPLICATIONS

This application relates to two companion applications titled PROCESS FOR MAKING COATINGS ON GRAPHITE USING INTERCALATED SPECIES, U.S. patent application Ser. No. 07/220,135 (Air Force Docket Number AF18054), and PRODUCTION OF 10 MICRON DIAMETER HOLLOW ALUMINA FIBERS, U.S. patent application Ser. No. 07/220,136 (Air Force Docket Number AF18055), both filed on the same date as this application and hereby incorporated by reference as if fully rewritten herein.

BACKGROUND OF THE INVENTION

The invention relates generally to a process for making ceramic fibers, and more specifically to a process for making metal oxide fibers from intercalated graphite fibers.

Ceramic fibers are valuable for use as, for example, high temperature thermal insulation. Ceramics are solid materials combining metallic elements with nonmetals, usually oxygen. The prior art teaches a variety of processes for making ceramic fibers, primarily by using very high temperature oxide melts or by requiring synthesis of elaborate polymeric precursors. An improved process for making ceramic fibers is needed. A particular need exists for a process for making ceramic fibers that permits control over the morphology, particularly the surface morphology, of the fibers.

It is, therefore, a principal object of the present invention to provide a process for making metal oxide fibers.

It is another object of the present invention to provide a process for making metal oxide fibers that permits control over the morphology and density of the fibers.

It is also an object of the present invention to provide a process for making multi-phase or composite metal oxide fibers.

It is a feature of the present invention that it may be modified to produce partly graphite, partly metal oxide fibers having unique electrical and thermal properties.

It is an advantage of the present invention that it makes oxide fibers without requiring a very high temperature oxide melt or synthesis of elaborate polymeric precursors.

It is another advantage of the present invention that it is a low temperature process.

It is also an advantage of the present invention that the process is simple to understand and to perform.

SUMMARY OF THE INVENTION

In accordance with the foregoing principles, objects, features and advantages, the present invention provides a novel process for making metal oxide fibers. The unique discovery of the present invention is that heating metal chloride intercalated graphite fibers at high temperatures in air removes the carbon by oxidation and leaves a metal oxide fiber having generally the size, shape and texture of the graphite fiber precursor.

Accordingly, the invention is directed to a method for making a metal oxide fiber, comprising the steps of providing a graphite fiber, intercalating a metal chloride into the graphite fiber and then heating the intercalated graphite fiber in air or oxygen to oxidize its carbon and leave a metal oxide fiber having generally the size and structure of the graphite fiber precursor.

The invention is also directed to a method for making a composite metal oxide fiber, comprising the steps of providing a graphite fiber, intercalating a plurality of metal chlorides into the fiber and heating the intercalated fiber to oxidize its carbon and leave a composite metal oxide fiber having generally the size and structure of the graphite fiber precursor. The invention includes using aluminum chloride with either of zirconium tetrachloride or ferric chloride as the intercalated metal chlorides.

The invention includes the additional step of densifying the composite metal oxide fiber by reheating.

The composite metal oxide fibers may be made by non-uniformly intercalating the metal chlorides into the graphite fiber to produce a resulting composite metal oxide fiber having a nonuniform distribution of metal oxide components.

The composite metal oxide fibers may also be made by non-uniformly heating the graphite fiber to produce a resulting metal oxide fiber having a nonuniform distribution of metal oxide components inside the fiber.

The invention is further directed to a method for making a composite fiber, comprising the steps of providing a graphite fiber, intercalating a metal chloride into the graphite fiber and heating a part area of the intercalated graphite fiber to oxidize its carbon at the heated part area and leave at that part area a metal oxide having generally the size and structure of the precursor graphite fiber.

The invention includes the metal oxide fibers made according to the disclosed methods.

DETAILED DESCRIPTION

A metal chloride is first intercalated into graphite fibers by standard techniques well known in the art. For example, to intercalate aluminum chloride ($AlCl_3$) into tows of Union Carbide P-100 fiber, the fibers are heated at ~300° C. in air to remove any sizing. The fibers are then placed inside a Pyrex tube to which aluminum chloride and chlorine gas ($Cl_2$) are added. The $Cl_2$ is frozen in the tube and the tube sealed under vacuum. The sample is next heated to generate a sufficient vapor pressure of aluminum chloride. After 1-3 days, the tube is cooled and opened in a drybox. The added $AlCl_3$ and $Cl_2$ will generally be sufficient to produce $C_n^+ AlCl_4^- (n \sim 36)$ in-between the interleaved layers comprising the graphite fibers.

The intercalated fibers are then heated in air to 800° C. Within 1-3 hours all the graphite burns off leaving a light and flexible metal oxide fiber tow. The individual fibers are visibly similar to the original P-100 fibers, including having a layered metal oxide microstructure along the previous layer planes. X-ray diffraction shows the fibers to be gamma alumina ($\gamma$-$Al_2O_3$), with no obvious preferred orientation. The fiber has a lower than expected density, ~0.6 g/cc compared to ~3.9 g/cc for a fully dense material. This lack of density, or porosity, is assumed to be due to escaping $CO_2$ and $Cl_2$ as the graphite fiber and intercalant is oxidized at 800° C.

Gamma $Al_2O_3$ can optionally be converted to alpha $Al_2O_3$ ($\alpha$-$Al_2O_3$) by heating above ~1200° C. Heating the gamma $Al_2O_3$ fibers in air at 1250° C. or 1400° C. for 6–12 hours to effect this phase change and, desirably, to densify the fibers (and generally make more rigid), produces alpha $Al_2O_3$, which is still very porous. Visibly, the fibers produced by this process have shown a vermicular (wormhole) layered structure.

To avoid producing this vermicular structure in alpha $Al_2O_3$, production of the gamma $Al_2O_3$ should be avoided, and alpha $Al_2O_3$ produced directly in a single heating after intercalation step. To accomplish this, the intercalated fibers are heated immediately to 1250° or 1400° C. The 1250° C. heating produces more dense, and non-vermicular, fibers. Fibers produced by this process have shown small pores (~0.1–0.3 $\mu$m) visible on the surface and a much less pronounced layering. The 1400° C. heating produces a much different morphology. The fibers are very segmented along their length and a skin of $Al_2O_3$ is present in place of the original graphite fiber surface. The skin has small pores and appears as a rolled scroll. The inside of fibers thus produced are not hollow, but rather are porous. The 1400° C. produced fiber is structurally weak compared to the 1250° C. produced fiber.

Other metal oxide fibers can be produced using the disclosed process. For example, fibers of $ZrO_2$ and $HfO_2$ have been made by burning fibers intercalated by the metal tetrachloride plus chlorine. The exact stoichiometry of the intercalated ions is unclear. Nevertheless, the process works to produce fibers of the desired metal oxide.

The kinetics of the $ZrO_2$ and $HfO_2$ fiber growth are significantly faster than those of $Al_2O_3$ fibers. Burning $C_nZrCl_{4+x}$ (n~36) or $C_nHfCl_{4+x}$ (n~80) produced white fibers in ~1 hour, rather than the three hours for $C_n{}^+AlCl_4{}^-$. For $ZrO_2$, air oxidation may be rapid because the diffusivity of oxygen in $ZrO_2$ is high so that transport of oxygen through the ceramic to the interior carbon is rapid.

Both the $ZrO_2$ and $HfO_2$ fibers have monoclinic unit cells, which is consistent with the 800° C. temperature at which they form. The $ZrO_2$ fibers have shown a strong preferred orientation of the $(\bar{1}11)$ planes along the fiber axis. The $HfO_2$ fibers have not shown a preferred orientation.

Stronger and tougher ceramics can be made by expanding the disclosed process to make two-phase, or multi-phase, fibers. A demonstration binary oxide fiber has been synthesized by intercalating a mixture of $AlCl_3$, $ZrCl_4$ and $Cl_2$ into graphite fibers to make $C_{3+6}{}^+AlCl_4{}^-\cdot ZrCl_5{}^-$. The material is heated to 250° C. for 4 days and all the metal chloride intercalated. When the fibers are heated at 800° C., some white fumes form, but the white ceramic fibers show Al/Zr=2.8. Thus, because the starting intercalated fiber has Al/Zr=1.0, more $ZrCl_4$ is volatilized than $AlCl_3$. The metal oxide fibers are 9–13 $\mu$m in diameter.

A unique property of the thus produced ceramic fibers is shown by X-ray diffraction which reveals the tetragonal phase of $ZrO_2$ in the presence of gamma $Al_2O_3$ (The gamma $Al_2O_3$ is inferred because it produces a very weak pattern. The $ZrO_2$ dominates the pattern). Pure tetragonal phase $ZrO_2$ is ordinarily stable only above 800° C., yet this tetragonal phase is present in fibers produced by this method.

Another example of a binary oxide fiber can be made by co-intercalating $AlCl_3$ and $FeCl_3$. This reaction has several advantages. First, $Fe_2O_3$ has the $\alpha$-$Al_2O_3$ structure, with lattice constants about 7% larger than $\alpha$-$Al_2O_3$. Second, intercalation of $AlCl_3$ requires the presence of $Cl_2$. $FeCl_3$ intercalates by vaporizing $FeCl_3$ and generating $Cl_2$. The $Cl_2$ produced by $FeCl_3$ may help intercalate $AlCl_3$. This avoids the direct handling and addition of $Cl_2$. Third, $AlCl_3$ and $FeCl_3$ can complex each other, to form $FeAlCl_6$ in the gas phase. In this way, they carry each other into the graphite in an intimate mixture.

In one example, an excess of $AlCl_3$ and $FeCl_3$ was sealed under vacuum with P-100 fibers, heated to ~200° C. and gradually increased over ~5 hours to 300° C. Loss of $AlCl_3$ and $FeCl_3$ was evident by the end of the 5 hours. The fibers were removed and then heated in air at 800° C. After 3 hours, the fibers were rusty-red on one end and white on the other end. The fibers on the rusty-red end were hollow and about 7–12 $\mu$m in diameter. Different X-ray analyses showed that the red fibers were ~22% Fe and 78% Al [$(Fe_{0.22}Al_{0.78})_2O_3$] with structures of $\gamma$-$Al_2O_3$ and a pattern similar to $\alpha$-$Al_2O_3$, (presumably $\alpha$-$Fe_2O_3$). The composition at the white end was 1–2% Fe in a $\gamma$-$Al_2O_3$ matrix. This transition over the length of the fibers may occur, for example, by non-uniform heating or intercalation over the lengths of the fibers.

Those with skill in the art of the invention will see that $AlCl_3$ can similarly complex many other metal chlorides of low volatility in order to intercalate multiple species.

Another variation of the disclosed process is to burn only one end of an intercalated graphite tow to produce, for example, a tow that is intercalated graphite at one end and alumina at the other. Each fiber changes, over a transition zone, from graphite to alumina. Thus, variations in electrical and thermal conductivity can be engineered into a fiber to provide unique electrical and thermal properties.

Those with skill in the art will also see that further experimentation with different pressures and temperatures will lead to a variety of other morphologies and structures.

Those with skill i the art will further readily see many possible applications for the fibers produced according to the described invention. For example, the light and flexible $\gamma$-$Al_2O_3$ fibers may be wrapped inside or in the shape of a refractory vessel and then heated to convert to the more rigid $\alpha$-$Al_2O_3$. The heat from normal use of the refractory vessel may even be used to cause the conversion, saving a manufacturing step.

The disclosed processes successfully demonstrate intercalating graphite fibers with metal chlorides and then burning off the graphite to leave metal oxide fibers having generally the same size and shape as had the graphite fibers. Although the disclosed processes are specialized, they will find application in other areas where specialized fibers are desired. Extension of their underlying methodologies using other chemical compounds can lead to preparation of other ceramic fibers. Other metal-bearing species can be intercalated into graphite and the graphite then removed to leave fibers of the other metal species, such as metal halides, metal nitrates or metal nitrites.

It is understood that other modifications to the invention as described may be made, as might occur to one with skill in the field of the invention. Therefore, all embodiments contemplated have not been shown in complete detail. Other embodiments may be developed without departing from the spirit of the invention or from the scope of the claims.

We claim:

1. A method for making a composite aluminum oxide-zirconinum oxide fiber, comprising the steps of:
   (a) providing a graphite fiber;
   (b) intercalating a mixture of $AlCl_3$, $ZrCl_4$ and $Cl_2$ into the graphite fiber to make $C_3^+{}_6 + AlCl_4^- \cdot ZrCl_5^-$ by heating the mixture to 250° C. for 4 days until all the metal chloride is intercalated into the graphite fiber; and,
   (c) heating the intercalated graphite fiber in air at 800° C. to oxidize the carbon and leave a composite aluminum oxide-zirconium oxide fiber.

2. A method for making a composite aluminum oxide-ferric oxide fiber, comprising the steps of:
   (a) providing a graphite fiber;
   (b) intercalating a mixture of $AlCl_3$ and $FeCl_3$ into the graphite fiber by heating the mixture to about 200° C. and gradually increasing the temperature over about 5 hours to 300° C.; and,
   (c) heating the intercalated graphite fiber in air at 800° C. to oxidize the carbon and leave a composite aluminum oxide-ferric oxide fiber.

* * * * *